United States Patent [19]

van der Bend et al.

[11] 3,979,372
[45] Sept. 7, 1976

[54] PREPARATION OF TITANIUM TRICHLORIDE POLYMERIZATION CATALYST COMPONENT

[75] Inventors: Herman Th. van der Bend; Willem Sjardijn, both of Amsterdam, Netherlands

[73] Assignee: Shell Oil Company, Houston, Tex.

[22] Filed: Dec. 30, 1974

[21] Appl. No.: 537,519

[30] Foreign Application Priority Data

Jan. 3, 1974 United Kingdom............... 278/74

[52] U.S. Cl. ................... 526/351; 252/429 A; 423/80; 423/85; 423/492; 526/169
[51] Int. Cl.² ................ C08F 4/64; C08F 110/06; B01J 31/02; C01G 23/02
[58] Field of Search ............ 260/93.7, 94.9 B; 423/85, 80, 492

[56] References Cited
UNITED STATES PATENTS

| | | | |
|---|---|---|---|
| 3,058,960 | 10/1962 | Stewart | 260/87.5 R |
| 3,562,239 | 2/1971 | de Jong et al. | 260/93.7 |
| 3,640,987 | 2/1972 | Phung et al. | 423/492 |
| 3,769,233 | 10/1973 | Hermans et al. | 423/85 |
| 3,825,524 | 7/1974 | Wada et al. | 260/93.5 S |
| 3,857,795 | 12/1974 | Van Der Bend et al. | 260/94.9 B |

FOREIGN PATENTS OR APPLICATIONS

| | | |
|---|---|---|
| 948,447 | 2/1964 | United Kingdom |
| 960,232 | 6/1964 | United Kingdom |

*Primary Examiner*—Alan Holler

[57] ABSTRACT

It is known to prepare highly active catalyst components for a Ziegler polymerization catalyst by reduction of titanium tetrachloride with an aluminum alkyl. An improvement in the preparation of such catalysts which leads to production of highly sterospecific as well as highly active catalyst components consists of including in the preparation the step of washing the reaction mixture which contains the desired $TiCl_3$ composition with an aliphatic hydrocarbon at temperatures above 40°C and separating the washed solids from the wash liquid at a temperature above 40°C. A heat treatment above 80°C precedes, accompanies, or follows the washing and separation step. The washing step may be carried out in a single or in multiple stages.

7 Claims, No Drawings

PREPARATION OF TITANIUM TRICHLORIDE POLYMERIZATION CATALYST COMPONENT

RELATION TO OTHER APPLICATION

This application discloses and claims subject matter which is an improvement on our co-pending application Ser. No. 316,191, now U.S. Pat. No. 3,857,795.

BACKGROUND OF THE INVENTION

1. Field of the Invention

This invention relates to an improvement in the production of $TiCl_3$-containing compositions for use as a catalyst component in olefin polymerization. More particularly, it relates to the production of $TiCl_3$ compositions which, when combined with an appropriate alkyl compound, result in highly stereospecific catalysts for propylene polymerization.

2. Description of the Prior Art

Polymers and copolymers of 1-olefins have achieved prominence in recent years since the discovery of the so-called transition metal or coordination catalysts, which make possible the production of such polymers, having very desirable properties, at relatively mild conditions of temperature and pressure. Of particular interest are the highly crystalline polymers of propylene, which have become known as stereoregular, or isotactic or stereosymmetric polypropylene, and also highly crystalline copolymers, e.g., block copolymers, and certain random copolymers that are formed by polymerizing propylene with a small amount of another 1-olefin, e.g., ethylene.

It is well known to polymerize olefins to linear polymers and, specifically, to polymerize propylene to stereoregular polypropylene by contact with catalysts having a titanium trichloride-containing component and a dialkylaluminum monohalide component.

It is known to produce the titanium trichloride catalyst components for such polymerization catalysts by reacting titanium tetrachloride in solution with an aluminum alkyl compound as reducing agent and to convert the product of the reduction by heating to one in which the titanium trichloride is present in a catalytically highly active and highly stereo-regulating form.

Polypropylene produced with certain such stereoregulating catalysts is generally referred to as "isotactic" polypropylene. This is characterized by the presence of propylene units in each molecule in sterically identical arrangement. The "isotactic" polypropylene component of sufficiently high molecular weight is insoluble in boiling n-heptane and in boiling diethyl ether and is also insoluble in $C_5$–$C_8$ aliphatic hydrocarbons at room temperature.

One of the desirable properties of commercial polypropylene is a high yield stress value, preferably at least 33 $MN/m^2$.

While it is desirable for commercial purposes to produce polypropylene of high "isotacticity", it is also desirable to control the polymerization so as to produce a high yield of polypropylene per unit weight of catalyst; for example, if polypropylene can be produced at a yield of more than 3000 grams per gram of $TiCl_3$, the product may be commercially useful without the conventional treatment for catalyst residue removal. Even if such extremely high activity is not obtained, the higher activity of the catalyst results in substantial process economies. For purposes of this specification, catalyst activity is measured in units of grams of polymer per gram of $TiCl_3$ per hour per bar of pressure.

A number of catalyst systems have been described which are capable of producing polypropylene of desirable commercial properties in relatively high yield. Such catalysts systems, which are further designed to produce polymer of high bulk density, are described, for example, in U.S. Pat. No. 3,562,239 to DeJong et al and in co-assigned U.S. patent application Ser. No. 316,191, filed Dec. 18, 1972 of Van Der Bend et al now U.S. Pat. No. 3,857,795. The $TiCl_3$ component of the catalyst of U.S. Pat. No. 3,562,239, as claimed, is produced by adding titanium tetrachloride to a trialkylaluminum solution at temperatures below −30°C but not below −90°C; thereafter gradually warming the mixture and maintaining it below 80°C until the reaction is essentially complete; and thereafter heating the mixture above 80°C, e.g., between 100° and 200°C, until the titanium trichloride therein is converted to violet gamma titanium trichloride.

According to said U.S. Pat. No. 3,857,795, the $TiCl_3$ component is produced by adding titanium tetrachloride to a trialkylaluminum solution at temperatures below −90°C, at certain controlled addition rates, followed by gradual controlled warming of the reaction mixture. This permits production, at will, of dense, smooth surfaced catalyst particles which result in a non-dusting high bulk density polymer, or of catalyst particles having a relatively porous surface which are particularly adapted to the production of block copolymers of relatively high bulk density.

In the polymerization of propylene, the titanium trichloride components produced by reduction of $TiCl_4$ are combined with an aluminum alkyl cocatalyst, preferably aluminum diethyl chloride.

In the patent art and literature of the polymerization on propylene via titanium trichloride-aluminum alkyl based catalysts, numerous methods and expedients have been described for modifying catalyst preparation conditions, catalyst compositions or polymerization conditions in order to achieve various desirable purposes such as producing catalysts having certain characteristics, polymers having certain characteristics or certain process advantages.

In the reaction of $TiCl_4$ with an alkyl aluminum compound, aluminum chlorides, such as aluminum ethyl dichloride and $AlCl_3$, are produced besides $TiCl_3$. The desired product is $TiCl_3$, but, in order for the $TiCl_3$ to be useful in producing highly crystalline polymers having a good yield stress (strength) in good yields, it has been suggested to remove the aluminum chlorides from the $TiCl_3$. It appears that the removal of $AlCl_3$ is quite difficult since $AlCl_3$ and $TiCl_3$ are isomorphous and crystallize readily together in the same crystalline lattice. Powerful complexing agents such as diphenyl ether and dibutylether have been suggested for said removal of $AlCl_3$. The disadvantage of the use of such agents is that they may have a deleterious effect on the yield stress and consequently will have to be carefully washed out of the $TiCl_3$ if used in excess. If so, it will be quite difficult, moreover, to completely remove the agent, e.g. ether. It has been found that the use of excessive amounts of complexing agent may result in permanent damage to the $TiCl_3$, not only resulting in loss of yield stress but also in diminished yield.

One expedient that has been described in the literature to modify a $TiCl_3$ catalyst component is washing with a suitable solvent prior to combining it with aluminum alkyl for use in the polymerization reaction. The following are representative references of this type:

United Kingdom Pat. No. 948,447, published Feb. 5, 1964, discloses a process for production of a titanium trichloride component for a polymerization catalyst by reducing a transition metal compound such as titanium tetrachloride by reaction with an alkyl aluminum halide in an inert liquid medium at a temperature from −100°C to 0°C, preferably between −21°C and −70°C, and thoroughly washing the resultant precipitate before use in the polymerization. Repeated thorough washing is disclosed to be essential. Liquids disclosed for use in the reduction reaction are propylene trimer, hexane, and hydrogenated oxygen-free diesel oil. Washing is preferably carried out "with an oxygen-free and hydrogenated hydrocarbon". Washing at an elevated temperature is not disclosed.

United Kingdom Pat. No. 960,232, to the same patentee as the above, is directed to a process for the production of olefin polymer or copolymer of high bulk density by polymerizing the olefins in the presence of a liquid dispersing agent, diethyl aluminum monochloride and a titanium-containing catalyst component which has been prepared from titanium tetrachloride and diethyl aluminum monochloride or aluminum ethyl sesquichloride at a temperature within the range of 0° to 20°C at specified reactant concentrations and mole ratios. The precipitated titanium trichloride-containing catalyst component is advantageously separated and washed out with an inert solvent or alternatively, the catalyst component suspension, before separating it from the dispersing agent, is subjected to an additional thermal treatment at temperatures between 40° and 150°C and then washed out. Example 2 of the patent shows a preparation in which the suspension was heated at 90°C but then cooled before the washing step. There is no disclosure of washing at an elevated temperature.

U.S. Pat. No. 3,058,970, to Rust et al, discloses a process for preparing a $TiCl_3$ catalyst component by reducing $TiCl_4$ with a dialkylaluminum halide between −20° and +15°C, followed by "annealing" between 60° and 100°C. It is disclosed that the annealing may be brought about by hot washing, for example, in "toluene, cyclohexane, methylcyclohexane, heptane, isooctane, or hydrogenized diesel oils boiling between 180° and 280°C". Hot washing is not further defined in the specification; in each of the illustrative examples the reaction mixture is cooled after the annealing step and is not separated from the liquid hydrocarbon at an elevated temperature.

Hot washing with a mixed solvent in which one component may be a hydrocarbon and the other is selected from a group of nonhydrocarbon compounds is disclosed is U.S. Pat. No. 3,825,524 to Wada et al, in which the "extraction" can be conducted at a temperature ranging from room temperature to the boiling point of the main solvent.

Another related disclosure is that of U.S. Pat. No. 3,640,987 to Phung et al, which is directed to a two-stage reduction of $TiCl_4$ by means of a hydride or organometallic compound, in which the first stage is carried out in low boiling solvent at temperatures below 50°C and the reduction is completed in a high boiling solvent at a temperature higher than 75°C.

SUMMARY OF THE INVENTION

This invention relates to a process for the preparation of gamma-activated $TiCl_3$, useful as a catalyst component in the polymerization of olefinically unsaturated compounds, in particular the polymerization of propene to stereoregular polypropylene, which comprises the following steps:

a. washing $TiCl_3$, obtained by reduction of $TiCl_4$ with an alkylaluminum compound at a temperature below 20°C, with an aliphatic hydrocarbon and separating the washed $TiCl_3$ from the hydrocarbon, the washing and separation being carried out at a temperature above 40°C;

b. heat-treating the $TiCl_3$ at a temperature above 80°C.

DESCRIPTION OF THE PREFERRED EMBODIMENTS

The same beneficial results as are obtainable by the prior art processes of extracting with complexing agents such as ethers are obtained by the improved washing process of the present invention in which the $TiCl_3$ composition is not only agitated with hot aliphatic hydrocarbons but is also subjected to physical separation of the solids from the hydrocarbon liquid at the elevated temperature.

The reduction of $TiCl_4$ with the alkylaluminum compound is carried out at a temperature below 20°C, preferably below −50°C and most preferably between −60°C and −110°C. Inert diluents, such as pentane, hexane, heptane and other saturated aliphatic hydrocarbons, are suitably employed in this step. The diluent is suitably chosen with a view to the lowest temperature employed in the reduction step. The freezing point of the diluent is generally at least 5°C lower, and preferably at least 15°C lower than the mixing temperature.

At reduction temperatures between −50°C and +20°C, the alkylaluminum compound to be used is suitably a dialkylaluminum monochloride, preferably diethylaluminum chloride. The dialkylaluminum chloride and $TiCl_4$ are generally employed in a molar ratio from 0.5:1 to 1.25:1, preferably from 0.6:1 to 1.1:1.

At reduction temperatures below −50°C, the alkylaluminum compound to be used is suitably a trialkylaluminum or a dialkylaluminum hydride, preferably triethylaluminum or diethylaluminum hydride. Suitable molar ratios between the trialkylaluminum and $TiCl_4$ are from 0.3:1 to 0.5:1, and particularly from 0.35:1 to 0.45:1. Dialkylaluminum hydrides are preferably used in an amount of 0.5–1.25 mol (in monomeric form) per mol of $TiCl_4$. At low temperatures, in solution, dialkylaluminum hydrides may occur in trimeric form, the use of which is considered to come within the scope of the invention.

The concentration of the alkylaluminum compound in the diluent is usually between 0.1 and 3, in particular between 0.5 and 1 mol/l. The $TiCl_4$, too, may be used in the form of a solution in an alkane in a concentration of 1–3 mol/l. Especially at reduction temperatures between −50°C and +20°C, the dialkylaluminum monochloride is suitably used in concentrated, e.g. undiluted, form. This may result in a higher catalyst activity. Although the $TiCl_4$ may also be used in high concentrations, this will usually not result in higher catalyst activities. At temperatures between −50°C and +20°C, the alkylaluminum compound is preferably added gradually to the $TiCl_4$. On the other hand, at reduction temperatures below −50°C, the TiCl$_4$ is suitably added gradually to the alkylaluminum compound. The rate of addition can affect the morphology of the particles, as described in said U.S. Pat. No. 3,857,795. It is desirable for the addition to be extended over a period of at least 15 minutes, preferably from 0.5 to 5 hours. TiCl$_4$ may be added as a continuous stream, but is more satisfactorily supplied dropwise by spraying or sprinkling.

Vigorous stirring of the reaction mixture is desirable. Generally, the specific stirring power, determined after completion of the TiCl$_4$ addition, should be kept within the range of 80–800 W/m$^3$ of the liquid reactor contents. The stirring power is determined via measurement of the torque of the driving motor and the speed of the impeller, as described in Chem. Eng. Progress 46 (1959) 395–404 and 467–477.

If the reduction of TiCl$_4$ has been effected at subzero temperatures, it is advantageous to raise the temperature of the TiCl$_4$-containing mixture to above 0°C gradually, i.e., over a period of at least two hours.

The TiCl$_3$, obtained by reduction of TiCl$_4$ as described, is washed with an aliphatic hydrocarbon and subsequently separated from the hydrocarbon, both operations being carried out at a temperature above 40°C, preferably above 80°C, and most preferably at a temperature between 90°C and 130°C. The upper temperature limit for these operations is mainly determined by the boiling point of the aliphatic hydrocarbon; usually said temperature will not exceed 200°C. "Washing" as used herein comprises any form of contacting the TiCl$_3$ with the hydrocarbon, either by slurrying the TiCl$_3$ in a stirred vessel, or by extraction in a rotating disc contactor or a wash tower in countercurrent flow, or by extracting the TiCl$_3$ on a filter with the hydrocarbon, or by any other suitable means. The essential feature of the invention is that both the washing and the separation are carried out at said temperatures above 40°C. Separation of the TiCl$_3$ from the hydrocarbon is effected by known means such as filtration, decantation, centrifugation, and settling; separation by evaporation only is, of course, an unsuitable method. The washing is suitably continued or repeated till the hydrocarbon separated from the TiCl$_3$ is substantially free from dissolved aluminum compounds. A simple test to determine whether the hydrocarbon is substantially free from aluminum compounds is by adding some water or alcohol. If aluminum compounds are present, a precipitate of hydroxy-aluminum compounds will be formed. The lower the washing/separation temperature, the longer the washing has to be continued or the more often it has to be repeated in order to obtain the desired result.

The aliphatic hydrocarbon used for the washing may be any alkane which is liquid under the washing conditions, such as pentane, hexane, isooctane, decane, dodecane and cyclohexane. Thus, at higher temperatures heavier hydrocarbons must be used, unless higher pressures are employed.

In order that the TiCl$_3$ develop its optimal properties (activity), it should be heat-treated at a temperature above 80°C, usually below 225°C, either before, after or during the washing/separation step. Preferred temperatures for this treatment are between 125° and 175°C, in particular between 145° and 165°C. The higher this temperature, the sooner the conversion from the beta-modification to the active, gamma-modification of TiCl$_3$ will be realized. Thus, the temperature of the washed TiCl$_3$ may be raised to 155°C in 1 to 3 hours, then kept at 155°C for 0.5 to 2 hours. Once the desired conversion has been completed it is preferred to cool rapidly to below 80°C.

As mentioned above, the heat-treatment at temperatures above 80°C may be performed either before, after or during the washing/separation step. In general, it is preferred to perform the washing/separation step at temperatures above 40°C prior to or simultaneously with the heat-treatment, the starting TiCl$_3$ being in the brown, beta modification. Especially in the higher washing temperature range the beta-TiCl$_3$ will start converting into gamma-TiCl$_3$ during the washing/separation step. In order to obtain the maximum activity of the gamma-modification, it is recommended to raise the temperature above 125°C as indicated above. The heat-treatment may be carried out in a solvent, suitably an aliphatic hydrocarbon. Alternatively, the heat-treatment may be performed while the TiCl$_3$ is in a dry, powder form. In the latter case, the heat-treated TiCl$_3$ powder is suitably redispersed in an aliphatic hydrocarbon so as to facilitate its metering into the polymerization reactor.

It is advantageous to give the washed TiCl$_3$ after the heat-treatment at temperatures above 125°C another washing/separation treatment with aliphatic hydrocarbon at a temperature above 40°C, in particular between 90° and 130°C.

If desired — prior to its use in the polymerization — the activated TiCl$_3$ may be brought into contact with sufficient propene in a liquid diluent at a temperature below 65°C, in particular between 50° and 60°C, to form at least 0.1 g, preferably 2–20 g of polypropene per gram of TiCl$_3$. Suitably, all or a part of the dialkylaluminum chloride used for the polymerization — to be described hereinafter — is already added at this prepolymerization stage. For example, equimolar quantities of aluminum and titanium compounds may be used. During the prepolymerization, excessive pressures, i.e. propene pressures above 2 bar (gauge), are less satisfactory.

For use as a polymerization catalyst, a dialkylaluminum chloride is suitably added to the activated TiCl$_3$ obtained. The molar ratio between these Al— and Ti—compounds may be between 0.5:1 and 10:1, in particular between 2:1 and 5:1. Fresh amounts of dialkylaluminum chloride can, if desired, be added during the polymerization.

The polymerization by means of the titanium trichloride compositions obtained according to the invention can be carried out on the analogy of all known and conventional processes in which TiCl$_3$ is used as catalysts. Whenever in this specification the terms polymerization, polymerizing and polymer are used, they embrace also copolymerization, copolymerizing and copolymer.

The unsaturated hydrocarbons which are polymerized according to the invention are, in particular ethene, propene and higher alkenes, such as 1-butene and 1-pentene. The invention may also be employed in the polymerization of styrene and of compounds containing more than one unsaturated bond, such as butadiene and other conjugated or unconjugated dienes, and in the copolymerization of two or more ethylenically unsaturated compounds. The invention is particularly important for the homopolymerization of propene and for the copolymerization of ethene and propene.

The polymerization normally takes place in an inert liquid medium but can also be performed in a diluent-free process in the liquid or vapor phase. Particularly suitable as solvents or diluents are aliphatic hydrocarbons. In a liquid phase, diluent-free process the polymerization is carried out in liquid monomer, in particular liquid propene. In such a process the polymer formed tends to settle out quite rapidly. Consequently, if reactor slurry is withdrawn from the bottom, concentrated slurry is drawn off. If the slurry is withdrawn over the top of the reactor, e.g. via a dipleg, a slurry of low concentration is obtained. Slurries of average reactor composition may be withdrawn about half-way the side-wall of the reactor via a conduit having a swan's neck-type entry.

As a rule, suitable concentrations of titanium compound during the polymerization are between 0.1 and 20 milliatoms of Ti per liter (1 milliatom of Ti = 48 mg). Higher and lower concentrations are possible, however.

Temperatures during the polymerization are as a rule between 20° and 90°C, preferably between 55° and 75°C. The pressure can also be an important factor in the polymerization of gaseous olefins. This pressure is usually between 1 and 50 bar and is seldom below 1 bar abs.

If desired, the polymerization can be carried out in the presence of substances, for example hydrogen, which lower the molecular weight of the polymer.

EXAMPLE I

The $TiCl_3$ compositions were prepared in a glass reactor having a volume of one liter and an internal diameter of about 9 cm. The reactor was equipped with a six-blade turbine stirrer which had a diameter of 5 cm and swept about 5% of the internal reactor volume at 400 revolutions per minute. All operations were carried out under nitrogen and in the absence of water, oxygen and aromatic hydrocarbons.

The solvent used was n-pentane. The reactor, including its cover, was cooled to −100°C and charged with 175 ml of a solution containing 140 mmol of triethylaluminum. Over a period of 3 hours, 200 ml of a two-molar solution of $TiCl_4$ was added dropwise. The reactor temperature was then allowed to rise to 20°C in 3 hours. The beta-$TiCl_3$ was washed at 20°C 2 times with isooctane, then reslurried in 25 ml of n-decane per 10 mmol of $TiCl_3$.

The slurry was stirred for 1.5 hours at 130°C, then filtered at this temperature. The $TiCl_3$ was reslurried in decane of 20°C.

The catalyst component so obtained was tested in homopolymerizations of propene at 70°C in the presence of a small amount (0.6 %v in the gas cap) of $H_2$. As a solvent, 1.5 l of the isooctane was added to a 3 l reactor provided with a turbine stirrer (1500 rpm). After the isooctane had been heated to 70°C, 9 mmol of $Al(C_2H_5)_2Cl$ was added, then 2.25 mmol $TiCl_3$, whereupon propene was introduced at a pressure of 2.6 bar (abs). The polymerization was continued for 4 hours, after which the pressure was released. Butanol was added to terminate the polymerization, whereupon the polymer suspension was washed with a 1 %w solution of HCl in water and three times with water. The solvent was stripped with steam. The results of the experiments are as follows:

| | |
|---|---|
| Catalyst activity, g polymer/g $TiCl_3$/h/bar | 79 |
| Yield stress, $MN/m^2$ | 35 |
| Soluble in isooctane, present in reactor, %w | 2.9 |

EXAMPLES II AND III

Examples II and III were carried out substantially as described in Example I, except that the washing and separation were carried out at 160°C. Comparative Example A was carried out in the same way except that the $TiCl_3$ was heated at 160°C in n-decane, then cooled to room temperature, i.e. without "hot filtration" of the decane. Results appear from the following table:

| Example | A | II | III |
|---|---|---|---|
| Heating time in n-decane, h | 1.0 | 1.0 | 0.1 |
| Catalyst activity, g/g/h/bar | 56 | 73 | 78 |
| Solubles, %w | 2.3 | 2.9 | 3.4 |
| Yield stress, $MN/m^2$ | 37.5 | 36.5 | 35.5 |

EXAMPLES IV–VII

These were carried out substantially as described in Example I, the differences being shown in the following table. The $TiCl_3$ of example IV was used as such after separation at 172°C. $TiCl_3$ of Examples V, VI and VII, after separation at the temperatures indicated, was heat-treated in isooctane at 160°C for 1 hour.

| Example | IV | V | VI | VII |
|---|---|---|---|---|
| Washing/separation | | | | |
| Solvent | decane | iso-octane | iso-octane | iso-octane |
| Number of wash steps, each time 25 ml/10 mmol $TiCl_3$ | 2 | 4 | 4 | 2 |
| Temperature, °C | 172 | 100 | 60 | 40 |
| Time, h | 0.2 | 1.0 | 1.0 | 2.5 |
| Polymerization | | | | |
| Catalyst activity g/g/h/bar | 71 | 78 | 80 | 78 |
| Yield stress, $MN/m^2$ | 36.0 | 36.5 | 36.0 | 35.0 |
| Solubles, %w | 3.5 | — | 4.0 | 3.5 |
| Melt index, g/10 min | 3.0 | 3.8 | 3.1 | 2.3 |

The following comparative example B shows that with aromatic hydrocarbons as wash solvent, less satisfactory results are obtained. $TiCl_4$ was reduced as set out in Example I at −100°C. After the washing at 20°C with isooctane the $TiCl_3$ was reslurried in n-decane (25 ml/10 mmol $TiCl_3$) and heated for 1 hour at 160°C, then cooled to room temperature. The gamma-$TiCl_3$ obtained was washed at room temperature with isooctane and subsequently reslurried in toluene (25 ml/10 mmol $TiCl_3$), heated to 60°C, stirred at this temperature for 0.5 hours and then filtered at 60°C. The $TiCl_3$ was reslurried in decane at 20°C and used in the polymerization procedure as described in Example I. The activity of the catalyst was 75 g polypropylene per gram of $TiCl_3$ per hour per bar of propylene, while the yield stress was only 33.5 $MN/m^2$.

EXAMPLE VIII a. A solution of 50 ml $TiCl_4$ in 200 ml isooctane was introduced at 0°C into a 750 ml flask, stirred at 500 rpm. In 3.6 hours, 58 ml of diethylaluminum chloride, dissolved in 150 ml of isooctane, was added at said temperature. The vessel contents were stirred for another 0.25 hours, then heated to 60°C in 1 hour and stirred for 1 hour at 60°C. The TiCl₃ obtained was washed 3 times at 20°C with isooctane. The TiCl₃ obtained was reslurried in n-decane (25 ml/10 mmol), heated to 160°C and after stirring for 0.25 hour filtered at 160°C. The washing/filtration at 160°C was repeated 3 times. The violet TiCl₃ obtained was used in a propene polymerization as described in Example I, the results of which are as follows:

| | |
|---|---|
| Catayst activity | 55 g polymer/g TiCl₃/h/bar |
| Yield stress | 31.5 MN/m² | b. An activity of only 30 was found for a TiCl₃ catalyst prepared as in (a) above, excluding the washing/separation at 160°C but including a one-hour heating step in isooctane at 160°C, followed by cooling — without separation — to room temperature, and use in the polymerization of propene as described in Example I.

We claim as our invention:

1. In the process for the preparation of gamma-activated TiCl₃, useful as a catalyst component in the stereoregular polymerization of alpha-monoolefins, which comprises the reduction of TiCl₄ to a beta-TiCl₃ composition by reaction with trialkylaluminum compound or a dialkyl-aluminum hydride at a temperature between −110° and −50°C and heating the so-produced TiCl₃ at a temperature in the range from above 80°C to 225°C for a sufficient time to substantially convert said beta to gamma-TiCl₃; the improvement which comprises washing the TiCl₃ composition with an aliphatic hydrocarbon and separating the washed TiCl₃ from the hydrocarbon, both the washing and separation being carried out at a temperature in the range from 40° to 200°C, and repeating the washing and separation until the hydrocarbon separated from the TiCl₃ is substantially free from dissolved aluminum compounds, wherein said heating may be conducted in the course of said washing treatment.

2. A process as claimed in claim 1, in which the washing of the TiCl₃ with an aliphatic hydrocarbon, and the separation therefrom, are carried out at a temperature above 80°C.

3. A process as claimed in claim 2, in which the washing and separation are carried out at a temperature between 90° and 130°C.

4. A process as claimed in claim 1, in which the heating step is effected at a temperature between 145° and 165°C.

5. A process as claimed in claim 1, in which the TiCl₃ is washed prior to or simultaneously with the heating step, separated from the wash liquid and thereafter is given another washing/separation treatment with an aliphatic hydrocarbon at a temperature above 40°C.

6. A process for the polymerization of an olefinically unsaturated compound, in which TiCl₃ produced as claimed in claim 1, is used as a catalyst component together with diethylaluminum chloride.

7. A process as claimed in claim 6, in which the olefinically unsaturated compound is propene.

* * * * *